US006950846B2

(12) United States Patent
Badovinatz et al.

(10) Patent No.: US 6,950,846 B2
(45) Date of Patent: Sep. 27, 2005

(54) PROVIDING A GLOBALLY CONSISTENT DESIRED GROUP OF REACHABLE NODES

(75) Inventors: Peter R. Badovinatz, Beaverton, OR (US); Myung M. Bae, Pleasant Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 843 days.

(21) Appl. No.: 09/893,092

(22) Filed: Jun. 27, 2001

(65) Prior Publication Data

US 2003/0009510 A1 Jan. 9, 2003

(51) Int. Cl.[7] .............................................. G06F 15/16
(52) U.S. Cl. ..................................... 709/201; 709/224
(58) Field of Search ................................. 709/201, 220, 709/224, 227, 249; 370/252, 254

(56) References Cited

U.S. PATENT DOCUMENTS

| | | | |
|---|---|---|---|
| 5,214,776 A | | 5/1993 | Bagnoli et al. ............. 395/425 |
| 5,235,597 A | | 8/1993 | Himwich et al. ......... 370/110.1 |
| 5,247,673 A | | 9/1993 | Costa et al. ................ 395/650 |
| 5,274,789 A | | 12/1993 | Costa et al. ................ 395/425 |
| 5,303,235 A | * | 4/1994 | Chan et al. ................. 370/254 |
| 5,539,881 A | * | 7/1996 | Hunt et al. ................. 709/230 |
| 5,621,721 A | | 4/1997 | Vatuone ....................... 370/16 |
| 5,768,538 A | | 6/1998 | Badovinatz et al. ... 395/200.78 |
| 5,790,772 A | | 8/1998 | Badovinatz et al. ... 395/182.02 |
| 5,799,146 A | | 8/1998 | Badovinatz et al. ... 395/182.02 |
| 5,799,149 A | | 8/1998 | Brenner et al. ......... 395/200.31 |
| 5,828,665 A | * | 10/1998 | Husak .................... 370/395.53 |
| 5,864,851 A | | 1/1999 | Breitbart et al. ............... 707/8 |
| 5,949,974 A | * | 9/1999 | Ewing et al. ............... 709/202 |
| 5,953,328 A | * | 9/1999 | Kim et al. ................... 370/337 |
| 5,991,821 A | | 11/1999 | Badovinatz et al. ... 395/200.78 |
| 5,999,931 A | | 12/1999 | Breitbart et al. ............. 707/10 |
| 6,014,669 A | | 1/2000 | Slaughter et al. ............. 707/10 |
| 6,016,505 A | | 1/2000 | Badovinatz et al. ........ 709/205 |
| 6,026,426 A | | 2/2000 | Badovinatz et al. ........ 709/106 |
| 6,058,416 A | | 5/2000 | Mukherjee et al. ......... 709/203 |
| 6,229,540 B1 | * | 5/2001 | Tonelli et al. .............. 709/227 |
| 6,385,174 B1 | * | 5/2002 | Li .............................. 370/252 |
| 6,477,572 B1 | * | 11/2002 | Elderton et al. ............ 709/224 |
| 6,480,473 B1 | * | 11/2002 | Chambers et al. .......... 370/253 |
| 6,516,345 B1 | * | 2/2003 | Kracht ....................... 709/220 |

* cited by examiner

*Primary Examiner*—Moustafa M. Meky
*Assistant Examiner*—Ramy Osman
(74) *Attorney, Agent, or Firm*—Lawrence D. Cutter, Esq.; Blanche E. Schiller, Esq.; Heslin Rothenberg Farley & Mesiti, P.C.

(57) ABSTRACT

A desired group of reachable nodes of a communications environment is provided. The desired group of reachable nodes includes one or more nodes that can communicate with one another via a same network of a plurality of networks of the communications environment. In one embodiment, the desired group of reachable nodes includes the largest set of nodes that can communicate with one another via a common network. A globally consistent view of this largest set of reachable nodes is provided to interested nodes of the communications environment.

71 Claims, 5 Drawing Sheets fig. 1 fig. 2 fig. 3 fig. 4A fig. 4B

PROVIDING A GLOBALLY CONSISTENT DESIRED GROUP OF REACHABLE NODES

TECHNICAL FIELD

This invention relates, in general, to communications environments, and in particular, to providing a globally consistent desired group of reachable nodes of a distributed computing environment.

BACKGROUND OF THE INVENTION

Within a distributed computing environment, there may be multiple communications networks among the nodes of the environment to provide high availability of the nodes. In order for messages initiated on one network to cross to another network, a router or a gateway between the networks is utilized.

It is usually the case that one of the networks provides significantly higher communication bandwidth than the others, and may be preferred for most communications. If the discrepancy between the bandwidths on the various networks is great enough, and for other reasons, applications may have to avoid automatic forwarding from one network to another. This is especially true for time and throughput sensitive applications, such as GPFS (General Parallel File System) offered by International Business Machines Corporation.

In those environments in which automatic forwarding is disabled, two distributed peers, X and Y, cannot communicate with each other, if a peer X is only able to communicate on one network and peer Y is only able to communicate on the other network. This is true even though there may be a third peer attached to both networks, which is reachable from both peers X and Y that could act as a gateway to reroute messages between X and Y.

One vexing aspect of this situation is that it is often difficult for peers X and Y to know that they cannot communicate with each other. If this happens, the applications on peers X and Y may continually try unsuccessfully to communicate between peers X and Y, or the applications may fall into an inconsistent state.

Thus, a need exists for a capability that provides the global status of communications networks of the environment, such that peers know with whom they can communicate. Further, a need exists for a capability that determines and/or provides a globally consistent desired group of reachable nodes of the environment.

SUMMARY OF THE INVENTION

The shortcomings of the prior art are overcome and additional advantages are provided through the provision of a method of providing a group of reachable nodes of a communications environment. The communications environment includes a plurality of networks, and the method includes, for instance, dynamically determining a group of reachable nodes of the communications environment, the group of reachable nodes including one or more nodes of the communications environment that can communicate with one another via a same network of the plurality of networks; and making available to one or more nodes of the communications environment an indication of the group of reachable nodes.

In another embodiment, a method of determining a group of reachable nodes of a communications environment is provided. The communications environment includes a plurality of nodes, wherein each node of at least a subset of the plurality of nodes is coupled to a plurality of networks. The method includes, for instance, detecting a status change of a network adapter of a network of the plurality of networks; performing an action, in response to the status change, that affects a network group associated with the network; and determining, in response to affecting the network group, membership in a group of reachable nodes.

In yet a further embodiment of the invention, a method of providing a desired group of nodes of a communications environment is provided. The communications environment includes a plurality of nodes, wherein each node of at least a subset of the plurality of nodes is coupled to a plurality of networks. The method includes, for instance, determining a group of one or more nodes of the communications environment, the group representing a network of the plurality of networks having a largest number of nodes that can communicate with one another via the network relative to one or more other networks of the plurality of networks; and providing a globally consistent view of the group.

System and computer program products corresponding to the above-summarized methods are also described and claimed herein.

Advantageously, a general infrastructure is provided that determines the global status of the communications networks of the environment, and presents a consistent view of the status of the nodes of the environment.

An additional benefit from one or more aspects of the present invention is that by providing the globally consistent view of the communications networks, applications, like GPFS, are able to maintain as their primary set of nodes on which to execute the largest set of nodes that can communicate with one another via a single network.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

In accordance with an aspect of the present invention, a desired group of reachable nodes of a communications environment is determined. This desired group of reachable nodes includes, for instance, the largest set of reachable nodes that can communicate with one another via a common network of the environment. In a further aspect of the present invention, this desired set of reachable nodes is provided to interested processes of the communications environment, so that those processes can make decisions based on the information.

Figure 1:
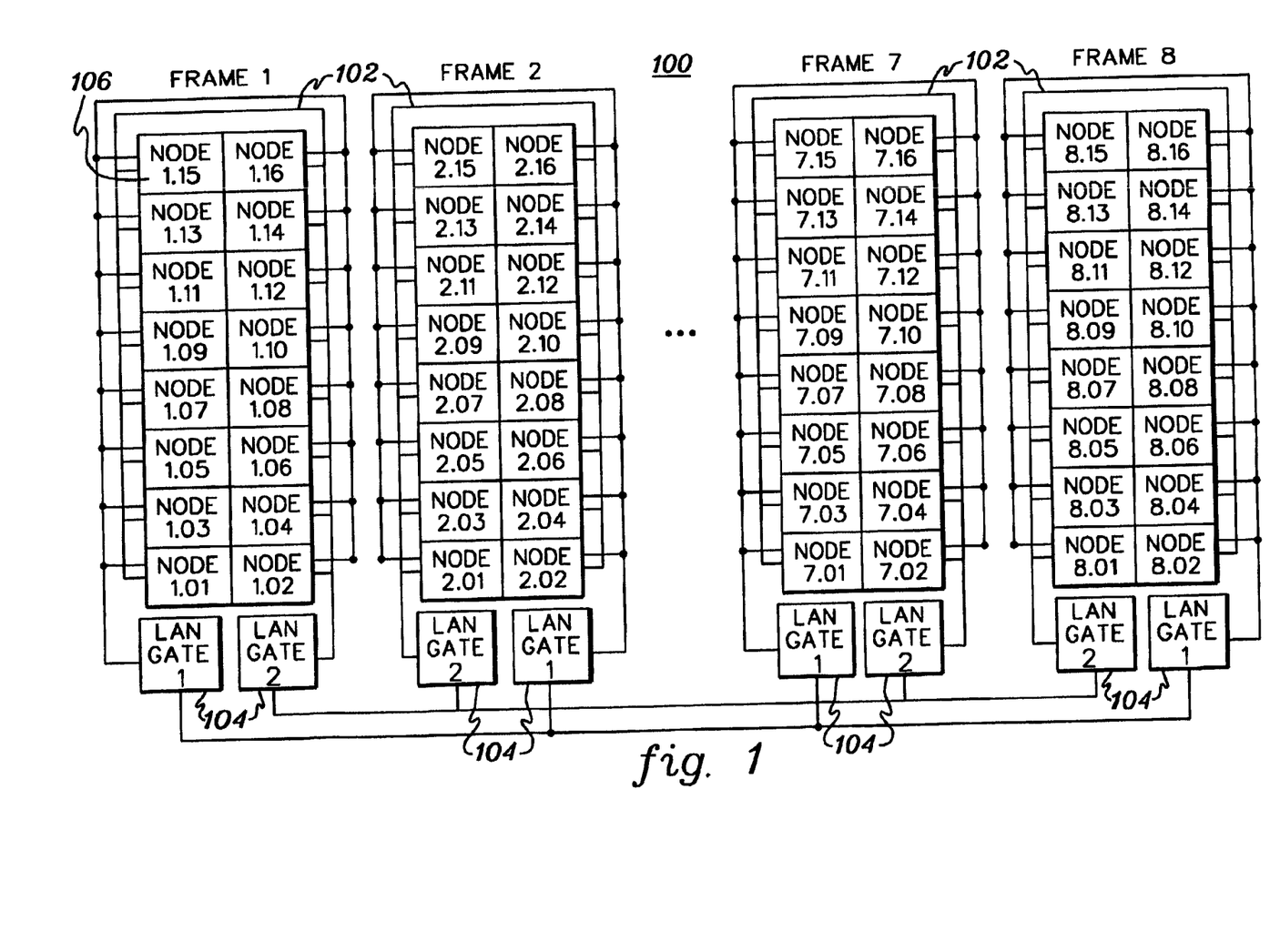
FIG. 1 depicts one embodiment of a communications environment incorporating and using aspects of the present invention.

One embodiment of a communications environment incorporating and using aspects of the present invention is depicted in FIG. 1. As one example, the communications environment is a distributed computing environment 100 including, for instance, a plurality of frames 102 coupled to one another via a plurality of LAN gates 104. Frames 102 and LAN gates 104 are described in detail below.

As one example, distributed computing environment 100 includes eight frames, each of which includes a plurality of processing nodes 106. In one instance, each frame includes sixteen processing nodes (a.k.a., processors). Each processing node is, for instance, a Risc/6000 computer running AIX, a UNIX based operating system. Each processing node within a frame is coupled to the other processing nodes of the frame via, for example, one or more networks, such as one or more internal LAN connections. Additionally, each frame is coupled to the other frames via one or more LAN gates 104.

As examples, each LAN gate 104 includes either a Risc/6000 computer, any computer network connection to the LAN or a network router. However, these are only examples. It will be apparent to those skilled in the relevant art that there are other types of LAN gates and that other mechanisms can also be used to couple the frames to one another.

The distributed computing environment of FIG. 1 is only one example. It is possible to have more or less than eight frames, or more or less than sixteen nodes per frame. Further, the processing nodes do not have to be Risc/6000 computers running AIX. Some or all of the processing nodes can include different types of computers and/or different operating systems. Further, aspects of the invention are usable with other types of communications environments. All of these variations are considered a part of the claimed invention.

In one example, distributed across a plurality of the processing nodes of distributed computing environment 100 is a Group Services subsystem used by one or more aspects of the present invention. In particular, in one example, a Group Services daemon 200 (FIG. 2) is located within one or more of processing nodes 106. The Group Services daemons are collectively referred to as Group Services.

Figure 2:
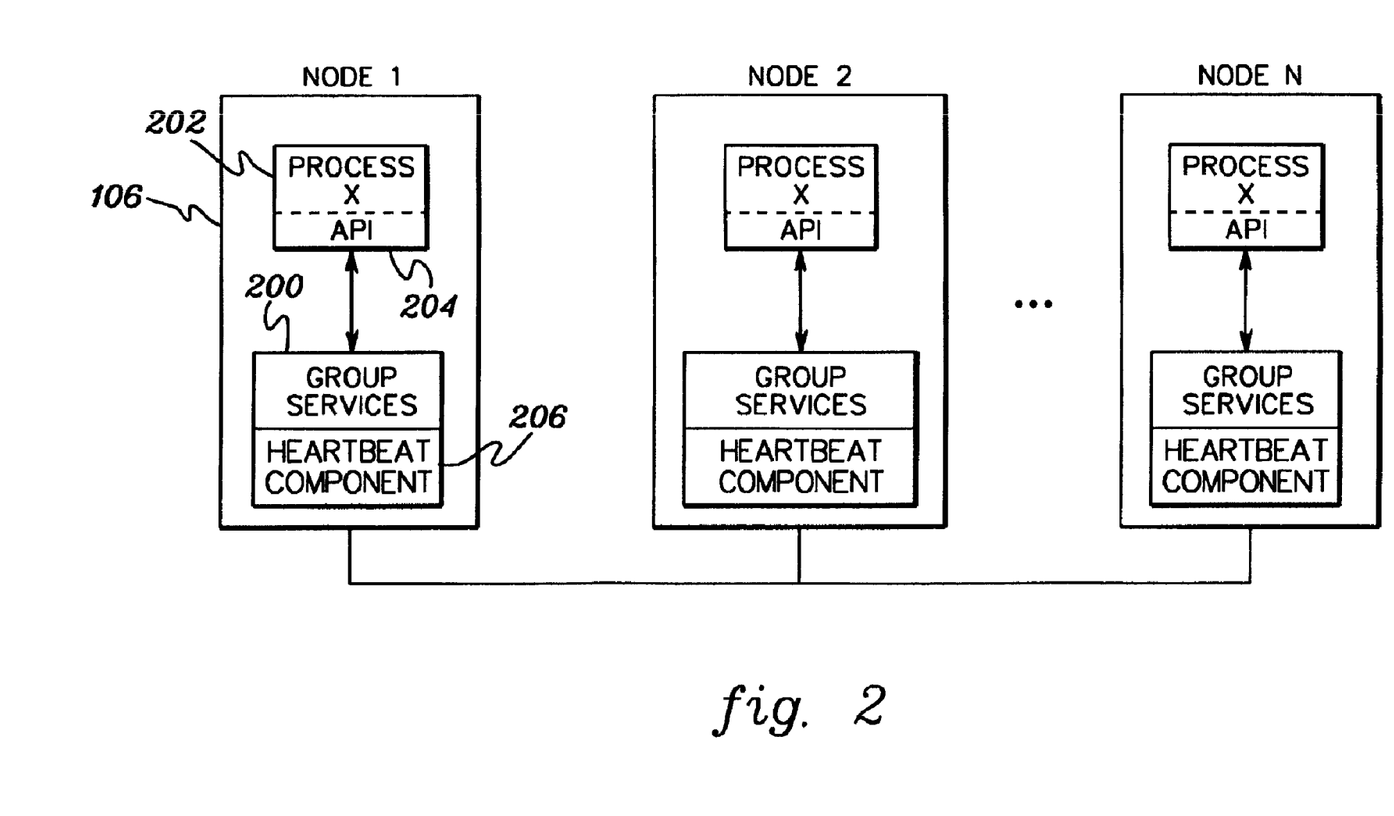
FIG. 2 depicts one example of an expanded view of a number of the processing nodes of the communications environment of FIG. 1, in accordance with an aspect of the present invention.

Group Services facilitates, for instance, communication and synchronization between multiple processes of a group of processes executing on one or more nodes. A process 202 (such as a determination process of the present invention, as described below) desirous of using the facilities of Group Services is coupled to a Group Services daemon 200. In particular, the process is coupled to Group Services by linking at least a part of the code associated with Group Services (e.g., the library code) into its own code. As one example, the process uses an application programming interface (API) 204 to access aspects of Group Services.

Group Services is coupled to a heartbeat component 206 used to indicate whether a particular component of the communications environment is active. In this example, the heartbeat component is used to determine whether adapters of the one or more networks of the environment are up and running, as described in further detail below.

Group Services is further described in U.S. Pat. No. 5,768,538 entitled "Barrier Synchronization Method Wherein Members Dynamic Voting Controls The Number of Synchronization Phases Of Protocols And Progression To Each New Phase", issued Jun. 16, 1998; U.S. Pat. No. 6,026,426, entitled "Application Programming Interface Unifying Multiple Mechanisms", issued Feb. 15, 2000; U.S. Pat. No. 6,016,505, entitled "Program Product To Effect Barrier Synchronization In A Distributed Computing Environment", issued Jan. 18, 2000; U.S. Pat. No. 5,799,146, entitled "Communications System Involving Groups Of Processors Of A Distributed Computing Environment", issued Aug. 25, 1998; U.S. Pat. No. 5,790,772, entitled "Communications Method Involving Groups Of Processors Of A Distributed Computing Environment", issued Aug. 4, 1998; and U.S. Pat. No. 5,991,821, entitled "Method For Serializing Actions Of Independent Process Group", issued Nov. 23, 1999, each of which is hereby incorporated herein by reference in its entirety.

In accordance with an aspect of the present invention, Group Services is utilized in determining which network of a plurality of networks of a communications environment has the greatest number of nodes (and thus, peer processes) that can communicate with one another through the particular network. To make this determination, the status of the adapters of the networks is taken into consideration.

Figure 3:
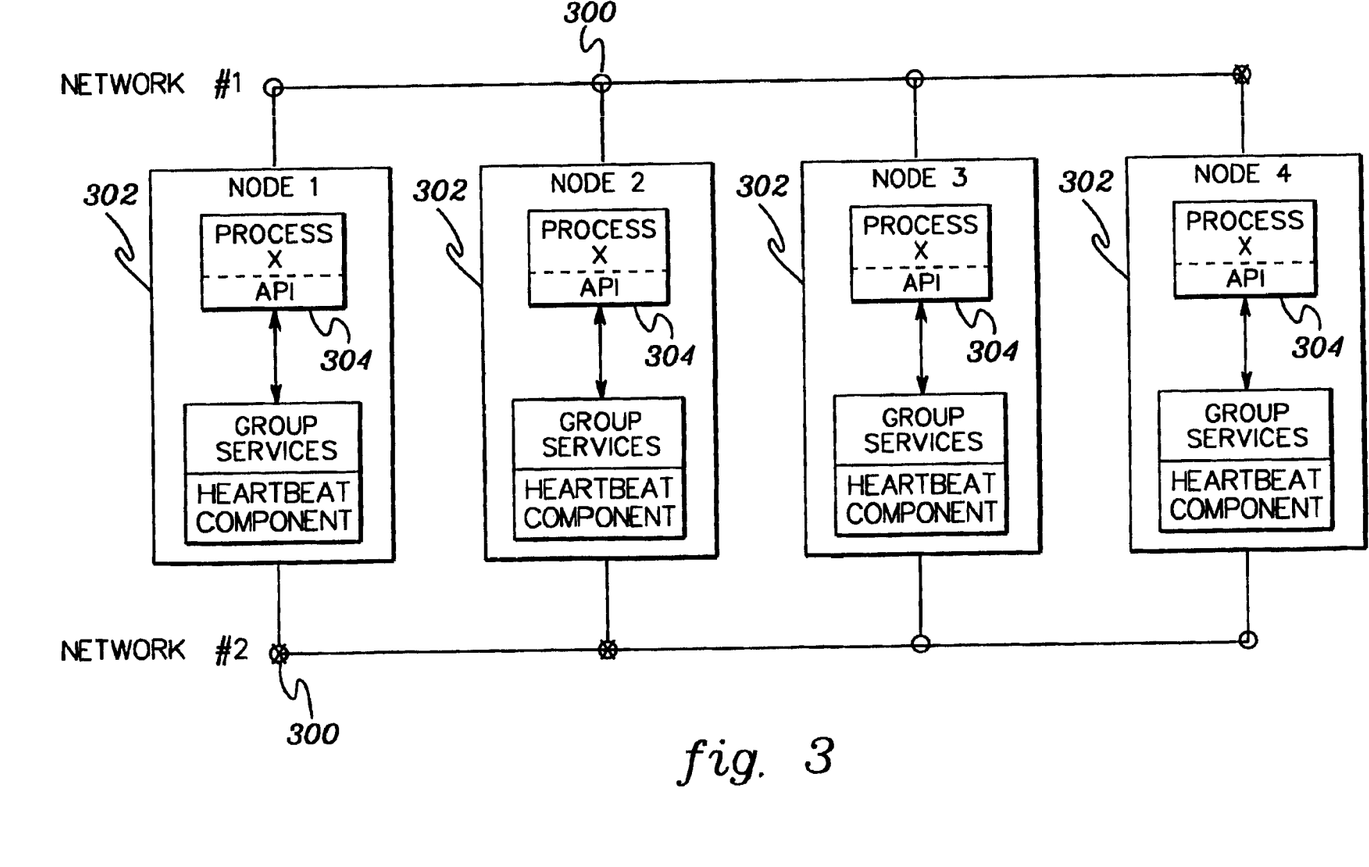
FIG. 3 depicts one example of various nodes of the communications environment coupled by a plurality of networks, in accordance with an aspect of the present invention.

For example, in the particular scenario depicted in FIG. 3, there are four nodes of a communications environment and two networks: Network #1 and Network #2. Each network has four adapters 300, and each adapter is coupled to at least one node 302. Since two of the adapters on Network #2 are down, only two nodes of that network can communicate with one another through that network. However, in Network #1, three nodes of the network can communicate with one another. Thus, in this particular example, Network #1 has the greatest number of nodes that can communicate with one another through a single network.

In the above scenario, if both networks had an equal number of nodes that could communicate with one another, then one of the networks would be selected as having the greatest number (or largest set). The selection can be performed in a variety of ways. For example, an arbitrary selection process can be used or a process based on one or more criteria may be used. The network that is selected is referred to herein as the network with the largest set of reachable nodes.

In order to make the determination of the largest set of reachable nodes, in one embodiment, a process 304 (referred to herein as a determination process) executes on each node within the environment that is interested in the determination. Each process includes the determination logic, as well as software objects to be employed. The logic also uses groups created by Group Services. Further details regarding the Group Services groups and the various software objects are provided below.

As one example, the following groups are managed by Group Services:

(1) GlobalAdaptMbrGroup# (where # is 1 to n): Each of these groups includes one or more processes of one or more nodes that are associated with a particular communications network being monitored for globally consistent adapter notifications (e.g., up and down status of the adapters of the associated network). For instance, for the example depicted in FIG. 3, there are two groups, GlobalAdaptMbrGroup1 and GlobalAdaptMbrGroup2, one for each of the networks.

GlobalAdaptMbrGroup1 includes three determination processes, one for each of Nodes 1–3, and GlobalAdaptMbrGroup2 includes two determination processes, one for Nodes 3 and 4.

(2) GlobalLargestMbrGroup: This group maintains the largest node set whose peer processes (i.e., the determination processes and/or other processes on the nodes) can communicate with one another by using one of the communications networks.

The plurality of software objects used by one or more aspects of the present invention include, for instance, the following:

(1) RawAdaptEvtSubscriber: This object is responsible for handling raw adapter event notifications for the communications adapters of the interested networks. This object keeps the status of each local communications adapter for each network associated with the node executing the determination process handling this object, and provides a callback routine to be called when the status of the local adapter changes. It includes, for instance, the following:

Status[ ]—UP or DOWN for an associated adapter. For example, AdapterStatus[1] indicates the status of the adapter which is on Network #1. That is, it indicates whether communications can occur through the adapter.

SubscribeCb( )—is called by an API of Group Services (GSAPI) when the status of an adapter is changed. This callback routine sets the Status[ ], as well as notifies an associated GlobalAdaptMbrProvider object (described below).

Pointers to related GlobalAdaptMbrProvider[ ].

(2) GlobalAdaptMbrProvider: This object is responsible for maintaining the globally consistent network adapter membership of GlobalAdaptMbrGroup# (e.g., GlobalAdaptMbrGroup1 or GlobalAdaptMbrGroup2). This object keeps the state that indicates whether the local node (i.e., the determination process of that node) joins the GlobalAdaptMbrGroup or not, and provides a callback AdaptEvtNotifiedCb( ) routine, which is called by the RawAdaptEvtSubscriber object. It includes, for instance, the following:

State—JOINED or IDLE.

AdaptEvtNotifiedCb( )—notified by RawAdaptEvtSubscriber object when an AdaptEvt occurs.

Pointer to RawAdaptEvtSubscriber object.

(3) GlobalAdaptMbrSubscriber: This object is responsible for handling a subscription to the globally consistent network adapter membership. This object maintains the membership list of its associated GlobalAdaptMbrGroup. It includes, for instance, the following:

AdaptMbrship—list of adapter membership of its associated GlobalAdaptMbrGroup.

Pointer to GlobalAdaptMbrProvider object.

NumberOfMembers( )—the number of adapter members in the membership list.

SubscribeCb( )—is called by GSAPI when there is a membership change of the associated GlobalAdaptMbrGroup group.

Pointer to GlobalLargestMbrProvider object.

(4) GlobalLargestMbrProvider: This object is responsible for maintaining the globally consistent LargestAdaptMbrGroup group. This object maintains the state of whether it is joined or not, and provides a callback routine GlobalAdaptMbrChangedCb( ), which is called by the GlobalAdaptMbrSubscriber object. It includes, for instance, the following:

State—JOINED or IDLE.

GlobalAdaptMbrChangedCb( )—called by GlobalAdaptMbrSubscriber.

Pointers to GlobalAdaptMbrSubscribers[ ].

The above described objects and groups are used, in accordance with an aspect of the present invention, to determine and provide a globally consistent group of reachable nodes of a communications environment. One embodiment of the logic associated with determining and providing such a group is described with reference to FIGS. 4a–4b. In one example, the logic is executed by the determination processes executing on one or more nodes of the communications environment, except for those portions handled by other services, such as the heartbeat component and/or Group Services, as indicated below.

Figure 4A:
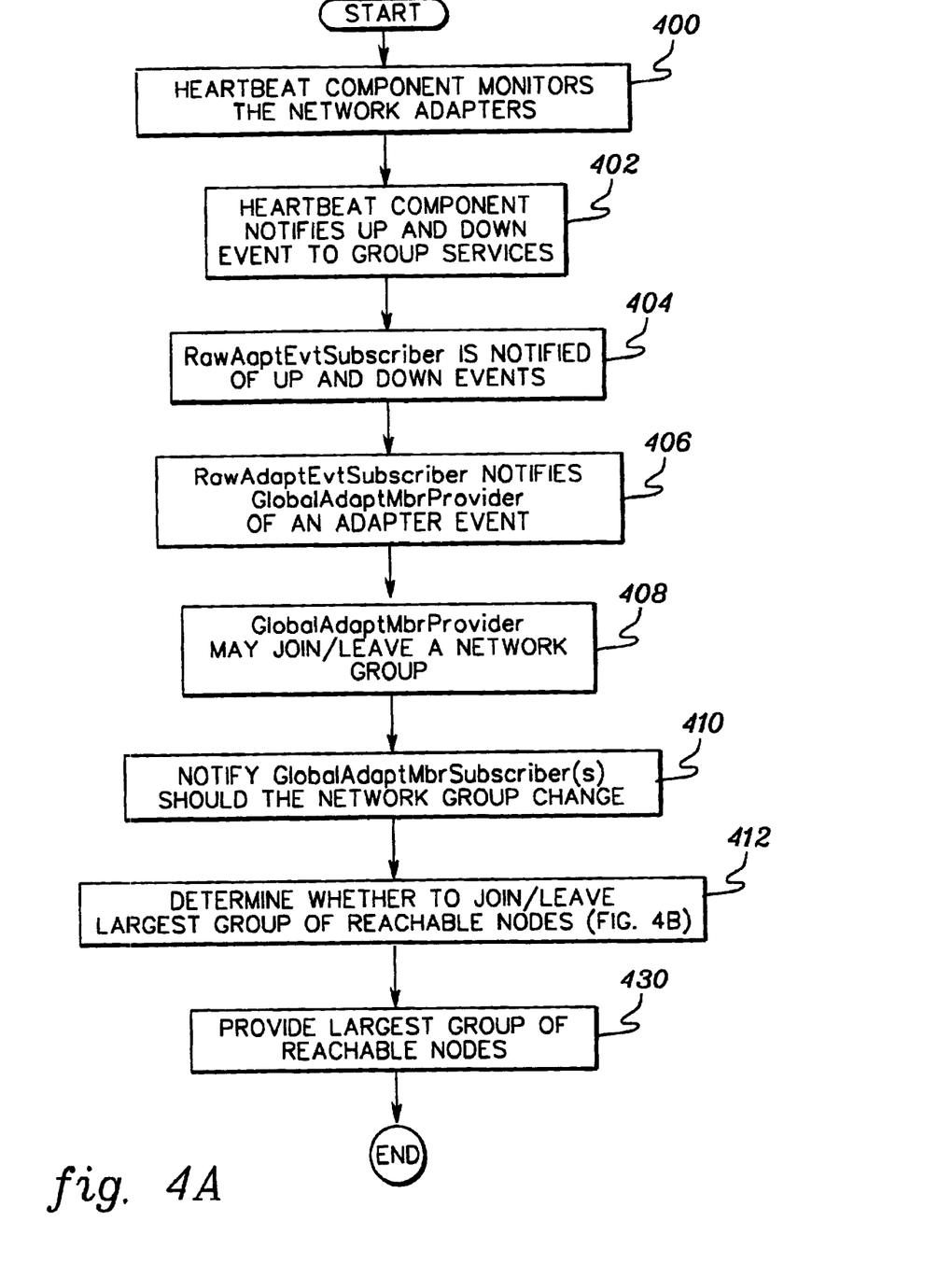
FIGS. 4a–4b depict one embodiment of the logic associated with determining and providing a globally consistent group of reachable nodes of a communications environment, in accordance with an aspect of the present invention.

Referring to FIG. 4a, on each node (or in another embodiment, on a subset of nodes), the heartbeat component monitors one or more network adapters of the communications environment, STEP 400. For example, the heartbeat component on a particular node sends a message to each of its associated adapters and waits for a return message. If such a message is not returned from an adapter, then the heartbeat component determines that the adapter is inaccessible. Should the status of one of its adapters change, the heartbeat component notifies Group Services of the change, STEP 402.

Group Services then notifies a subscriber to the event (referred to herein as RawAdaptEvtSubscriber) of the status change, STEP 404. For example, the Application Programming Interface (API) of Group Services invokes RawAdaptEvtSubscriber→>SubscribeCb( ) on the node detecting the status change. SubscribeCb( ) sets the adapter status (i.e, Status[ ]) to either up or down, according to the adapter events.

Further, the subscriber notifies its associated provider of the event, STEP 406. (In one embodiment, the subscriber and provider are in the same process.) For instance, if the adapter event is related to Network #n, then the subscriber notifies GlobalAdaptMbrProvider[n], STEP 406. In the example depicted in FIG. 3, either GLobalAdaptMbrProvider[1] for Network #1 or GlobalAdaptMbrProvider[2] for Network #2 is notified. In particular, the AdaptEvtNotifiedCb( ) of that provider is called. (In another embodiment, one or more subscribers are notified of the event, and one of those subscribers notifies a provider.)

When a GlobalAdaptMbrProvider object receives an AdaptEvtNotifiedCb( ) callback, it determines whether it will join its associated network group (e.g., GlobalAdaptMbrProvider[n]), leave the group or do nothing, STEP 408. The decision is based on the following: If the local adapter (i.e., the adapter of the node including the provider object) is newly up and the state is equal to Idle, then the provider joins the group GlobalAdaptMbrGroup[n], and sets the state to Joined. However, if the local adapter is newly down and the state is Joined, then the provider leaves the group GlobalAdaptMbrGroup[n], and sets the state to Idle. Otherwise, the provider takes no action.

If the network group changes, then one or more subscriber objects (referred to herein as GlobalAdaptMbrSubscriber(s)) interested in changes to the network group are notified, STEP 410. In one example, each node of the various networks includes a subscriber to this event. Thus, in the example of FIG. 3, Nodes 1–4 subscribe to this event. (In another embodiment, a subset of the nodes subscribe.) To notify each subscriber, the Group Services API calls GlobalAdaptMbrSubscriber→>SubscribeCb( ) on the subscriber's node.

SubscribeCb( ) performs the following actions: A count of the number of active members of the group GlobalAdaptMbrGroup is saved in a value referred to as AdaptMbrship. Further, when the membership of GlobalAdaptMbrGroup is changed, SubscribeCb( ) calls GlobalLargestMbrProvider→>GlobalAdaptMbrChangedCb( ) to determine whether it is to join or leave the largest group of reachable nodes, STEP 412. One embodiment of the logic used to make this determination is described with reference to FIG. 4b.

Figure 4B:
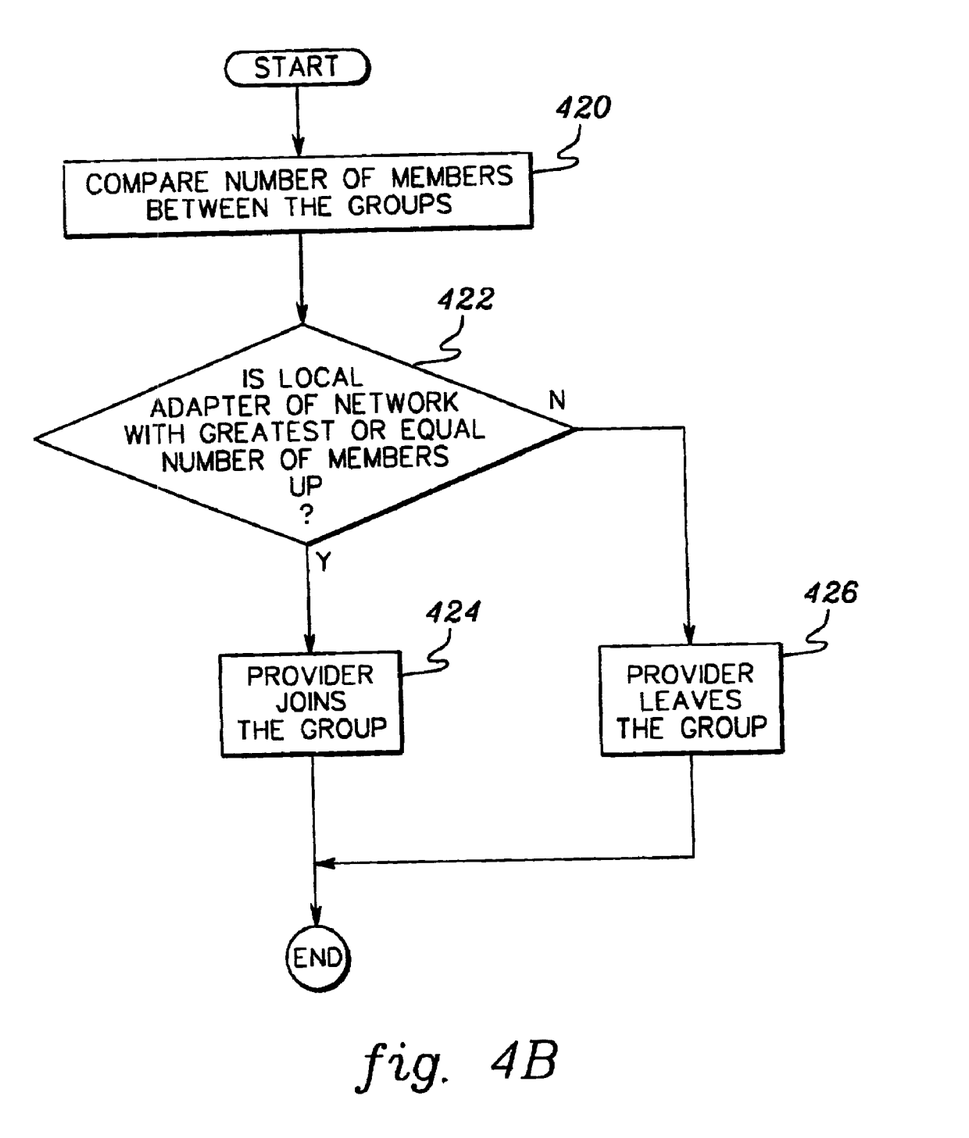

Referring to FIG. 4b, when GlobalAdaptMbrChangedCb( ) is called, the object GlobalAdaptMbrProvider first compares the numbers of members between the groups (e.g., between GlobalAdaptMbrGroup[1] and GlobalAdaptMbrGroup[2]) to determine which group has the largest number of members, STEP 420.

Thereafter, a determination is made as to whether the local adapter of the network with the greatest number (or equal number) of members (i.e., nodes or determination processes) is up, INQUIRY 422. If so, then the provider joins the GlobalLargestMbrGroup, assuming the provider is not already a member of the group, STEP 424. Otherwise, the provider leaves the GlobalLargestMbrGroup, assuming the provider is a member of the group, STEP 426.

A further example is provided herein. Assume there are two networks, and thus, a GlobalAdaptMbrGroup[1] and a GlobalAdaptMbrGroup[2]. A GlobalAdaptMbrProvider (e.g., for Network 1) compares the numbers of members between the groups, GlobalAdaptMbrGroup[1] and GlobalAdaptMbrGroup[2]. Using this information, it determines whether it will join or leave the group GlobalLargestMbrGroup.

Scenario 1: If the number of Up adapters in Network #1 is greater than or equal to the number of Up adapters in Network #2, and the local adapter in Network #1 is up, then the provider is in the largest node set whose peer processes can communicate with one another, and thus, it joins the group GlobalLargestMbrGroup. However, if the number of Up adapters in Network #1 is greater than or equal to the number of Up adapters in Network #2, and the local adapter in Network #1 is down, then the provider leaves the group GlobalLargestMbrGroup.

Scenario 2: If the number of Up adapters in Network #2 is greater than the number of Up adapters in Network #1, and the local adapter in Network #2 is up, then the provider joins the group GlobalLargestMbrGroup. However, if the number of Up adapters in Network #2 is greater than the number of Up adapters in Network #1, and the local adapter in Network #2 is down, then the provider leaves the group GlobalLargestMbrGroup.

The above is shown in the following table:

The above logic is executed for each of the subscribers to the GlobalAdaptMbrGroup#n, thus providing the largest group of reachable nodes. An indication of the largest group is provided (e.g., through Group Services) to one or more nodes of the communications environment, STEP 430 (FIG. 4a). In one example, a global consistent view of GlobalLargestMbrGroup is provided to any of the nodes (i.e., determination processes and/or other processes) that subscribe to the GlobalLargestMbrGroup. That is, each subscriber views the group as it is changing and in the order that it changes.

Advantageously, aspects of the present invention enable processes to be notified in a globally consistent manner, in response to the occurrence of adapter up/down events. This enables the processes to perform any necessary or desired actions for each adapter up/down event. The process knows the global adapter memberships and knows the largest node set whose peer processes can communicate with one another via a single network. Using this information, the process can decide whether to continue to run or stop.

In one embodiment, when a determination process fails or a node is blocked from communicating with other nodes, other determination processes on the other nodes receive failure notifications for affected Group Services groups (e.g., GlobalAdaptMbrGroup[ ] and GlobalLargestMbrGroup). On such failure notifications, the largest set of reachable nodes is re-determined, as described above.

In summary, problems that one or more aspects of the present invention address are as follows:

A distributed application with peer processes running on separate network-connected nodes may not know whether its peers can communicate with each other, especially when they do not have a working adapter on a common network, even if they are reachable through another node which has both adapters working on the different networks.

Even if the peer processes of the distributed application are in communication with some set of their peers, they still may not know whether they are in the largest set of nodes which are to be able to communicate with the other nodes in the set. Without having the globally consistent knowledge of the largest node set, the applications cannot correctly choose the largest node set that will continue to run the applications.

The objects, groups and logic described above are offered as examples. Variations are possible without departing from the claimed invention. For instance, there may be a plurality of providers and/or subscribers being executed on each node to participate in aspects of the invention.

Further, the example depicted in FIG. 3 is only one example. Aspects of the invention are equally applicable to more or less nodes and/to more than two networks.

The present invention can be included in an article of manufacture (e.g., one or more computer program products) having, for instance, computer usable media. The media has embodied therein, for instance, computer readable program

| Adapter #1 | Adapter #2 | Network #1 >= Network #2 | Network #1 < Network #2 |
| --- | --- | --- | --- |
| UP | UP | JOIN | JOIN |
| UP | DOWN | JOIN | LEAVE |
| DOWN | UP | LEAVE | JOIN |
| DOWN | DOWN | LEAVE | LEAVE | code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of providing a group of reachable nodes of a communications environment, said communications environment including a plurality of networks, and said method comprising:

dynamically determining a group of reachable nodes of said communications environment, said group of reachable nodes including a largest set of nodes of the communications environment that can communicate with one another via a same network of the plurality of networks; and making available to one or more nodes of the communications environment an indication of the group of reachable nodes by providing a globally consistent view of the largest set of nodes of the group of reachable nodes to the one or more nodes of said communications environment.

2. The method of claim 1, wherein said dynamically determining comprises ascertaining, by each node of one or more nodes of said communications environment, whether said each node is to be a member of said group.

3. The method of claim 2, wherein said ascertaining comprises:

determining the network of said plurality of networks having the largest set of nodes that can communicate with one another via that network; and determining a status of a component associated with the network determined to have a largest set of nodes, wherein the ascertaining of whether the node is to be a member of the group is based at least in part on the status.

4. The method of claim 3, wherein said component comprises a network adapter of said node.

5. The method of claim 4, wherein said node is to be a member of said group of reachable nodes when said network adapter has an up status.

6. The method of claim 2, wherein the one or more ascertaining nodes includes one or more nodes notified of a prespecified event.

7. The method of claim 6, wherein said prespecified event comprises a change in membership of a network group of said communications environment.

8. The method of claim 1, wherein the one or more nodes provided the globally consistent view comprises one or more nodes that subscribe to one or more changes associated with the group of reachable nodes.

9. The method of claim 1, wherein said dynamically determining is performed in response to a predefined event.

10. The method of claim 9, wherein said predefined event includes a change in membership of a network group of said communications environment.

11. The method of claim 10, wherein said change in membership of said network group is in response to a change in status of an adapter associated with said network group.

12. A method of determining a group of reachable nodes of a communications environment, said communications environment including a plurality of nodes, wherein each node of at least a subset of the plurality of nodes is coupled to a plurality of networks, said method comprising:

detecting a status change of a network adapter of a network of said plurality of networks;

performing an action, in response to the status change, that affects a network group associated with the network; and determining, in response to affecting the network group, membership in a group of reachable nodes, wherein said determining includes ascertaining, by each node of one or more nodes of the communications environment, whether said each node is to be a member of said group, and wherein said ascertaining comprises:

determining a network of said plurality of networks having a largest set of nodes that can communicate with one another via that network: and determining a status of a component associated with the network determined to have a largest set of nodes, wherein the ascertaining of whether the node is to be a member of the group is based at least in part on the status.

13. The method of claim 12, wherein said performing an action comprises having a process of a node coupled to the network adapter with the status change join or leave the network group.

14. The method of claim 12, wherein said component comprises an adapter of said node.

15. The method of claim 14, wherein said node is to be a member of said group of reachable nodes when said adapter has an up status.

16. The method of claim 12, wherein the one or more ascertaining nodes comprises one or more nodes notified of the affect on the network group.

17. The method of claim 12, wherein the group of reachable nodes comprises a largest set of reachable nodes that can communicate with one another via a same network.

18. The method of claim 12, further comprising providing to one or more nodes of said communications environment a globally consistent view of said group of reachable nodes.

19. A method of providing a desired group of nodes of a communications environment, said communications environment comprising a plurality of nodes, wherein each node of at least a subset of said plurality of nodes is coupled to a plurality of networks, and wherein said method comprises:

determining a group of one or more nodes of said communications environment, said group including a network of said plurality of networks having a largest number of nodes that can communicate with one another via the network relative to one or more other networks of said plurality of networks; and providing a globally consistent view of the network with the largest set of nodes of said group.

20. The method of claim 19, wherein said providing comprises providing said globally consistent view to one or more nodes of said communications environment indicating a desire to be notified of one or more changes to said group.

21. The method of claim 19, wherein said determining is performed in response to a predefined event.

22. The method of claim 21, wherein said predefined event includes a change in membership of a network group of said communications environment.

23. The method of claim 22, wherein said change in membership of said network group is in response to a change in status of an adapter associated with said network group.

24. A system of providing a group of reachable nodes of a communications environment, said communications environment including a plurality of networks, and said system comprising:

means for dynamically determining a group of reachable nodes of said communications environment, said group of reachable nodes including a largest set of nodes of the communications environment that can communicate with one another via a same network of the plurality of networks; and means for making available to one or more nodes of the communications environment an indication of the group of reachable nodes by providing a globally consistent view of the largest set of nodes of the group of reachable nodes to the one or more nodes of said communications environment.

25. The system of claim 24, wherein said means for dynamically determining comprises means for ascertaining, by each node of one or more nodes of said communications environment, whether said each node is to be a member of said group.

26. The system of claim 25, wherein said means for ascertaining comprises:

means for determining the network of said plurality of networks having the largest set of nodes that can communicate with one another via that network; and means for determining a status of a component associated with the network determined to have a largest set of nodes, wherein the ascertaining of whether the node is to be a member of the group is based at least in part on the status.

27. The system of claim 26, wherein said component comprises a network adapter of said node.

28. The system of claim 27, wherein said node is to be a member of said group of reachable nodes when said network adapter has an up status.

29. The system of claim 25, wherein the one or more ascertaining nodes includes one or more nodes notified of a prespecified event.

30. The system of claim 29, wherein said prespecified event comprises a change in membership of a network group of said communications environment.

31. The system of claim 24, wherein the one or more nodes provided the globally consistent view comprises one or more nodes that subscribe to one or more changes associated with the group of reachable nodes.

32. The system of claim 24, wherein the dynamically determining is performed in response to a predefined event.

33. The system of claim 32, wherein said predefined event includes a change in membership of a network group of said communications environment.

34. The system of claim 33, wherein said change in membership of said network group is in response to a change in status of an adapter associated with said network group.

35. A system of determining a group of reachable nodes of a communications environment, said communications environment including a plurality of nodes, wherein each node of at least a subset of the plurality of nodes is coupled to a plurality of networks, said system comprising:

means for detecting a status change of a network adapter of a network of said plurality of networks;

means for performing an action, in response to the status change, that affects a network group associated with the network; and means for determining, in response to affecting the network group, membership in a group of reachable nodes, wherein said means for determining comprises means for ascertaining, by each node of one or more nodes of said communications environment, whether said each node is to be a member of said group, said means for ascertaining comprising:

means for determining a network of said plurality of networks having a largest set of nodes that can communicate with one another via that network: and means for determining a status of a component associated with the network determined to have a largest set of nodes, wherein the ascertaining of whether the node is to be a member of the group is based at least in part on the status.

36. The system of claim 35, wherein said means for performing an action comprises means for having a process of a node coupled to the network adapter with the status change join or leave the network group.

37. The system of claim 35, wherein said component comprises an adapter of said node.

38. The system of claim 37, wherein said node is to be a member of said group of reachable nodes when said adapter has an up status.

39. The system of claim 35, wherein the one or more ascertaining nodes comprises one or more nodes notified of the affect on the network group.

40. The system of claim 35, wherein the group of reachable nodes comprises a largest set of reachable nodes that can communicate with one another via a same network.

41. The system of claim 35, further comprising means for providing to one or more nodes of said communications environment a globally consistent view of said group of reachable nodes.

42. A system of providing a desired group of nodes of a communications environment, said communications environment comprising a plurality of nodes, wherein each node of at least a subset of said plurality of nodes is coupled to a plurality of networks, and wherein said system comprises:

means for determining a group of one or more nodes of said communications environment, said group including a network of said plurality of networks having a largest number of nodes that can communicate with one another via the network relative to one or more other networks of said plurality of networks; and means for providing a globally consistent view of the network with the largest set of nodes of said group.

43. The system of claim 42, wherein said means for providing comprises means for providing said globally consistent view to one or more nodes of said communications environment indicating a desire to be notified of one or more changes to said group.

44. The system of claim 42, wherein the determining is performed in response to a predefined event.

45. The system of claim 44, wherein said predefined event includes a change in membership of a network group of said comunications environment.

46. The system of claim 45, wherein said change in membership of said network group is in response to a change in status of an adapter associated with said network group.

47. A system of providing a group of reachable nodes of a communications environment, said communications environment including a plurality of networks, and said system comprising:

at least one node adapted to dynamically determine a group of reachable nodes of said communications environment, said group of reachable nodes including a largest set of nodes of the communications environment that can communicate with one another via a same network of the plurality of networks; and an indication of the group of reachable nodes provided to one or more nodes of the communications environment, said indication providing a globally consistent view of the largest set of nodes of the group of reachable nodes to the one or more nodes of said communications environment.

48. A system of providing a desired group of nodes of a communications environment, said communications environment comprising a plurality of nodes, wherein each node of at least a subset of said plurality of nodes is coupled to a plurality of networks, and wherein said system comprises:

a group of one or more nodes of said communications environment, said group including a network of said plurality of networks having a largest number of nodes that can communicate with one another via the network relative to one or more other networks of said plurality of networks; and a globally consistent view of the network with the largest set of nodes of said group.

49. At least one program storage device readable by a machine, tangibly embodying at least one program of instructions executable by the machine to perform a method of providing a group of reachable nodes of a communications environment, said communications environment including a plurality of networks, and said method comprising:

dynamically determining a group of reachable nodes of said communications environment, said group of reachable nodes including a largest set of nodes of the communications environment that can communicate with one another via a same network of the plurality of networks; and making available to one or more nodes of the communications environment an indication of the group of reachable nodes by providing a globally consistent view of the larest set of nodes of the group of reachable nodes to the one or more nodes of said communications environment.

50. The at least one program storage device of claim 49, wherein said dynamically determining comprises ascertaining, by each node of one or more nodes of said communications environment, whether said each node is to be a member of said group.

51. The at least one program storage device of claim 50, wherein said ascertaining comprises:

determining the network of said plurality of networks having the largest set of nodes that can communicate with one another via that network; and determining a status of a component associated with the network determined to have a largest set of nodes, wherein the ascertaining of whether the node is to be a member of the group is based at least in part on the status.

52. The at least one program storage device of claim 51, wherein said component comprises a network adapter of said node.

53. The at least one program storage device of claim 52, wherein said node is to be a member of said group of reachable nodes when said network adapter has an up status.

54. The at least one program storage device of claim 50, wherein the one or more ascertaining nodes includes one or more nodes notified of a prespecified event.

55. The at least one program storage device of claim 54, wherein said prespecified event comprises a change in membership of a network group of said communications environment.

56. The at least one program storage device of claim 49, wherein the one or more nodes provided the globally consistent view comprises one or more nodes that subscribe to one or more changes associated with the group of reachable nodes.

57. The at least one program storage device of claim 49, wherein said dynamically determining is performed in response to a predefined event.

58. The at least one program storage device of claim 57, wherein said predefined event includes a change in membership of a network group of said communications environment.

59. The at least one program storage device of claim 58, wherein said change in membership of said network group is in response to a change in status of an adapter associated with said network group.

60. At least one program storage device readable by a machine, tangibly embodying at least one program of instructions executable by the machine to perform a method of determining a group of reachable nodes of a communications environment, said communications environment including a plurality of nodes, wherein each node of at least a subset of the plurality of nodes is coupled to a plurality of networks, said method comprising:

detecting a status change of a network adapter of a network of said plurality of networks;

performing an action, in response to the status change, that affects a network group associated with the network; and determining, in response to affecting the network group, membership in a group of reachable nodes, wherein said determining comprises ascertaining, by each node of one or more nodes of said communications environment, whether said each node is to be a member of said group, and wherein said ascertaining comprises:

determining a network of said plurality of networks having a largest set of nodes that can communicate with one another via that network; and determining a status of a component associated with the network determined to have a largest set of nodes, wherein the ascertaining of whether the node is to be a member of the group is based at least in part on the status.

61. The at least one program storage device of claim 60, wherein said performing an action comprises having a process of a node coupled to the network adapter with the status change join or leave the network group.

62. The at least one program storage device of claim 60, wherein said component comprises an adapter of said node.

63. The at least one program storage device of claim 62, wherein said node is to be a member of said group of reachable nodes when said adapter has an up status.

64. The at least one program storage device of claim 60, wherein the one or more ascertaining nodes comprises one or more nodes notified of the affect on the network group.

65. The at least one program storage device of claim 60, wherein the group of reachable nodes comprises a largest set of reachable nodes that can communicate with one another via a same network.

66. The at least one program storage device of claim 60, wherein said method further comprises providing to one or more nodes of said communications environment a globally consistent view of said group of reachable nodes.

67. At least one program storage device readable by a machine, tangibly embodying at least one program of instructions executable by the machine to perform a method of providing a desired group of nodes of a communications environment, said communications environment comprising a plurality of nodes, wherein each node of at least a subset of said plurality of nodes is coupled to a plurality of networks, and wherein said method comprises:

determining a group of one or more nodes of said communications environment, said group including a network of said plurality of networks having a largest number of nodes that can communicate with one another via the network relative to one or more other networks of said plurality of networks; and providing a globally consistent view of the network with the largest set of nodes of said group.

68. The at least one program storage device of claim 67, wherein said providing comprises providing said globally consistent view to one or more nodes of said communications environment indicating a desire to be notified of one or more changes to said group.

69. The at least one program storage device of claim 67, wherein said determining is performed in response to a predefined event.

70. The at least one program storage device of claim 69, wherein said predefined event includes a change in membership of a network group of said communications environment.

71. The at least one program storage device of claim 70, wherein said change in membership of said network group is in response to a change in status of an adapter associated with said network group.

* * * * *

UNITED STATES PATENT AND TRADEMARK OFFICE
CERTIFICATE OF CORRECTION

PATENT NO. : 6,950,846 B2 Page 1 of 1
DATED : September 27, 2005
INVENTOR(S) : Badovinatz et al.

It is certified that error appears in the above-identified patent and that said Letters Patent is hereby corrected as shown below:

Column 13,
Line 41, delete the word "larest" and insert -- largest --.

Signed and Sealed this

Sixth Day of December, 2005

JON W. DUDAS
*Director of the United States Patent and Trademark Office*